(12) United States Patent
Kamiya

(10) Patent No.: US 10,311,137 B2
(45) Date of Patent: Jun. 4, 2019

(54) GRAMMAR GENERATION FOR AUGMENTED DATATYPES FOR EFFICIENT EXTENSIBLE MARKUP LANGUAGE INTERCHANGE

(71) Applicant: FUJITSU LIMITED, Kawasaki-shi, Kanagawa (JP)

(72) Inventor: Takuki Kamiya, Palo Alto, CA (US)

(73) Assignee: FUJITSU LIMITED, Kawasaki (JP)

( * ) Notice: Subject to any disclaimer, the term of this patent is extended or adjusted under 35 U.S.C. 154(b) by 752 days.

(21) Appl. No.: 14/639,820

(22) Filed: Mar. 5, 2015

(65) Prior Publication Data
US 2016/0259763 A1    Sep. 8, 2016

(51) Int. Cl.
G06F 17/00 (2006.01)
G06F 17/22 (2006.01)
G06F 17/27 (2006.01)

(52) U.S. Cl.
CPC ........ G06F 17/2252 (2013.01); G06F 17/227 (2013.01); G06F 17/2247 (2013.01); G06F 17/2258 (2013.01); G06F 17/272 (2013.01)

(58) Field of Classification Search
CPC .................................................. G06F 17/2252
See application file for complete search history.

(56) References Cited

U.S. PATENT DOCUMENTS

| | | | | |
|---|---|---|---|---|
| 7,565,339 | B2 * | 7/2009 | Schneider | G06N 5/02 706/47 |
| 7,853,724 | B2 * | 12/2010 | Schneider | G06F 9/541 707/601 |
| 8,120,515 | B2 * | 2/2012 | Schneider | H03M 7/30 341/50 |
| 8,250,465 | B2 * | 8/2012 | Uchida | G06F 17/2258 341/106 |

(Continued)

FOREIGN PATENT DOCUMENTS

EP    2 161 667 A1    3/2010
GB    2 490 731 A    11/2012

OTHER PUBLICATIONS

Rumen Kyusakov et. al., "Efficient XML Interchange in Factory Automation Systems", IECON 2011—37th Annual Conference on IEEE Industrial Electronics Society, Nov. 7-10, 2011, pp. 4478-4483.*

(Continued)

*Primary Examiner* — Scott T Baderman
*Assistant Examiner* — Benjamin Smith
(74) *Attorney, Agent, or Firm* — Maschoff Brennan

(57) ABSTRACT

A method may include receiving an extensible markup language schema definition (XSD) including multiple elements having a datatype. Each of the multiple elements may include an attribute profile defining a presence or an absence of at least one attribute. A first two or more of the multiple elements may include a first particular attribute profile. The method may further include generating a first grammar (Continued)

based on the XSD. The first grammar may be associated with encoding and decoding extensible markup language (XML) documents based on the XSD to and from efficient XML interchange (EXI) streams. The first grammar may also be associated with the first particular attribute profile. The method may further include associating each of the first two or more of the multiple elements with the first grammar.

16 Claims, 5 Drawing Sheets

(56) References Cited

U.S. PATENT DOCUMENTS

| | | | | |
|---|---|---|---|---|
| 8,341,129 B2* | 12/2012 | Denoual | G06F 17/2258 | 707/693 |
| 8,364,621 B2* | 1/2013 | Fablet | G06F 17/2247 | 706/21 |
| 8,601,368 B2* | 12/2013 | Fablet | G06F 17/2247 | 715/234 |
| 8,627,200 B2* | 1/2014 | Bellessort | G06F 17/2247 | 715/234 |
| 8,698,657 B2* | 4/2014 | Fablet | H03M 7/3086 | 341/106 |
| 8,700,680 B2* | 4/2014 | Doi | G06F 17/2247 | 707/804 |
| 8,788,934 B2* | 7/2014 | Doi | G06F 17/2252 | 715/234 |
| 8,849,726 B2* | 9/2014 | Ishizaki | G06F 17/2247 | 706/12 |
| 8,850,309 B2* | 9/2014 | Fablet | G06F 17/2247 | 715/234 |
| 8,862,531 B2* | 10/2014 | Schneider | G06N 5/02 | 706/47 |
| 8,892,991 B2* | 11/2014 | Doi | G06F 17/272 | 715/234 |
| 8,897,741 B2* | 11/2014 | Johnson | H04W 4/02 | 455/404.2 |
| 8,930,924 B2* | 1/2015 | Fablet | G06F 17/2252 | 717/146 |
| 8,949,207 B2* | 2/2015 | Fablet | G06F 9/505 | 707/693 |
| 8,954,457 B2* | 2/2015 | Fablet | G06F 17/2247 | 707/757 |
| 9,069,734 B2* | 6/2015 | Bellessort | G06F 17/2258 | |
| 9,208,256 B2* | 12/2015 | Fablet | G06F 17/30917 | |
| 2002/0077823 A1* | 6/2002 | Fox | G06F 8/34 | 704/260 |
| 2004/0225754 A1* | 11/2004 | Lee | H03M 7/30 | 709/247 |
| 2007/0150494 A1* | 6/2007 | Harrington | G06F 17/2247 | |
| 2007/0239393 A1* | 10/2007 | Schneider | G06N 5/02 | 702/127 |
| 2007/0239881 A1* | 10/2007 | Schneider | H03M 7/30 | 709/231 |
| 2008/0082556 A1* | 4/2008 | Schneider | H03M 7/30 | |
| 2009/0183067 A1* | 7/2009 | Fablet | G06F 17/2247 | 715/234 |
| 2009/0210783 A1* | 8/2009 | Bellessort | G06F 17/2247 | 715/234 |
| 2009/0287625 A1* | 11/2009 | Fablet | G06F 17/2247 | 706/45 |
| 2009/0319594 A1* | 12/2009 | Schneider | G06F 9/541 | 709/201 |
| 2010/0010995 A1* | 1/2010 | Fablet | H03M 7/30 | 706/46 |
| 2010/0023470 A1* | 1/2010 | Schneider | G06N 5/02 | 706/47 |
| 2010/0083101 A1* | 4/2010 | Denoual | G06F 17/2247 | 715/242 |
| 2010/0107052 A1* | 4/2010 | Uchida | G06F 17/2247 | 715/234 |
| 2010/0153837 A1* | 6/2010 | Bellessort | G06F 17/2247 | 715/234 |
| 2010/0192056 A1* | 7/2010 | Bellessort | G06F 17/2247 | 715/237 |
| 2010/0287460 A1* | 11/2010 | Denoual | G06F 17/2247 | 715/234 |
| 2010/0322527 A1* | 12/2010 | Fablet | G06F 17/2252 | 382/232 |
| 2011/0010614 A1* | 1/2011 | Fablet | G06F 17/2229 | 715/234 |
| 2011/0153531 A1* | 6/2011 | Ishizaki | G06F 17/2247 | 706/12 |
| 2012/0150828 A1* | 6/2012 | Fablet | G06F 9/505 | 707/693 |
| 2012/0254231 A1* | 10/2012 | Doi | G06F 17/2264 | 707/769 |
| 2012/0254724 A1* | 10/2012 | Doi | G06F 17/272 | 715/234 |
| 2012/0254725 A1* | 10/2012 | Doi | G06F 17/2252 | 715/234 |
| 2012/0330984 A1* | 12/2012 | Fablet | G06F 17/2247 | 707/755 |
| 2013/0086016 A1* | 4/2013 | Schneider | G06F 9/541 | 707/695 |
| 2013/0103721 A1* | 4/2013 | Doi | G06F 17/30914 | 707/802 |
| 2013/0104033 A1* | 4/2013 | Doi | G06F 17/2247 | 715/234 |
| 2013/0337789 A1* | 12/2013 | Johnson | H04W 4/02 | 455/414.1 |
| 2013/0337836 A1* | 12/2013 | Johnson | H04W 4/02 | 455/456.2 |
| 2014/0026030 A1 | 1/2014 | Kamiya | | |
| 2014/0070966 A1* | 3/2014 | Fablet | H03M 7/3086 | 341/55 |
| 2014/0082481 A1* | 3/2014 | Doi | G06F 17/2247 | 715/234 |
| 2014/0297692 A1* | 10/2014 | Doi | G06F 17/3092 | 707/803 |
| 2014/0372868 A1 | 12/2014 | Kamiya | | |
| 2015/0128114 A1* | 5/2015 | O'Hara | G06F 8/71 | 717/143 |
| 2016/0026326 A1* | 1/2016 | Wu | G06F 3/04883 | 345/173 |
| 2016/0259763 A1* | 9/2016 | Kamiya | G06F 17/227 | |
| 2016/0259764 A1* | 9/2016 | Kamiya | G06F 17/218 | |

OTHER PUBLICATIONS

Schneider, et al., "Efficient XML Interchange Format 1.0", Feb. 14, 2014, retrieved from the internet: URL: http://www.w3.org/TR/exi/, retrieved on Oct. 14, 2015 | Relevant section: 8.5.4.2.

Kamiya, "RE: [LC-2363] xsi:type feature simplification" xsi public comments mailing list, Aug. 27, 2010, retrieved from the internet: URL: https://lists.w3.org/Archives/Public/public-exi-comments/2010Aug/0001.html, retrieved on Jul. 6, 2016 | Relevant pp. 1-6.

Fablet et al., "Efficient XML Interchange (EXI) Profile for limiting usage of dynamic memory", Sep. 9, 2014 retrieved from the internet URL:https://www.w3.org/TR/exi-profile, retrieved on Jul. 12, 2016 | Relevant sections: 1 and 3.

Extended European Search Report for corresponding application No. 16153247.8, dated Jul. 20, 2016 | Relevant pp. 2-9.

EXIP: A Framework for Embedded Web Development, Rumen Kyusakov, et al., Oct. 2014 | Relevant pp. 5-15.

EXIficient processor. See http://exificient.sourceforge.net, retrieved on Mar. 5, 2015 | Relevant pp. 1-2.

* cited by examiner

_US 10,311,137 B2_

GRAMMAR GENERATION FOR AUGMENTED DATATYPES FOR EFFICIENT EXTENSIBLE MARKUP LANGUAGE INTERCHANGE

FIELD

The embodiments discussed herein are related to grammar generation for augmented datatypes.

BACKGROUND

Extensible markup language (XML) is a markup language that defines a set of rules for encoding documents in a plain-text format that may be both human-readable and machine-readable. One version of XML is defined in the XML 1.0 Specification produced by the World Wide Web Consortium (W3C) and dated Nov. 26, 2008, which is incorporated herein by reference in its entirety. The XML 1.0 Specification defines an XML document as a text that is well-formed and valid.

An XML schema is a description of a type of XML document, typically expressed in terms of constraints on the structure and content of documents of that type, above and beyond the basic syntactical constraints imposed by the XML 1.0 Specification itself. These constraints are generally expressed using some combination of rules governing the order of elements, Boolean predicates associated with the content, data types governing the content of elements and attributes, and more specialized rules such as uniqueness and referential integrity constraints. An XML document or set of XML documents may include an associated XML schema definition (XSD). The XSD may generally describe the XML schema associated with an XML document.

Efficient XML interchange (EXI) is a binary XML format in which XML documents are encoded in a binary data format rather than plain text. In general, using an EXI format may reduce the size and verbosity of XML documents, and may reduce the time and effort expended to parse XML documents. A formal definition of EXI is described in the EXI Format 1.0 Specification produced by the W3C and dated Feb. 11, 2014, which is incorporated herein by reference in its entirety. An XML document may be encoded in an EXI format as an EXI stream. Additionally, the EXI stream may be decoded to form an XML document similar to or the same as the original XML document.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving an extensible markup language schema definition (XSD) including multiple elements having a datatype. Each of the multiple elements may include an attribute profile defining a presence or an absence of at least one attribute. A first two or more of the multiple elements may include a first particular attribute profile. The method may further include generating a first grammar based on the XSD. The first grammar may be associated with encoding and decoding EXI documents based on the XSD. The first grammar may also be associated with the first particular attribute profile. The method may further include associating each of the first two or more of the multiple elements with the first grammar.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Prior to encoding an extensible markup language (XML) document into an efficient XML interchange (EXI) stream or decoding an EXI stream into an XML document, an associated XML schema definition (XSD) may be normalized into grammars. The grammars are rules that may be used to predict specific sequences of the XML document. An algorithm to generate the grammars for an XSD is included in the EXI Format 1.0 Specification.

According to some embodiments described herein, elements having a same particular attribute profile may be assigned the same generated grammar. Thus, in some instances, multiple elements may result in fewer generated grammars, potentially significantly reducing the memory space occupied by grammar definitions.

Embodiments of the present disclosure will be explained with reference to the accompanying drawings.

Figure 1:
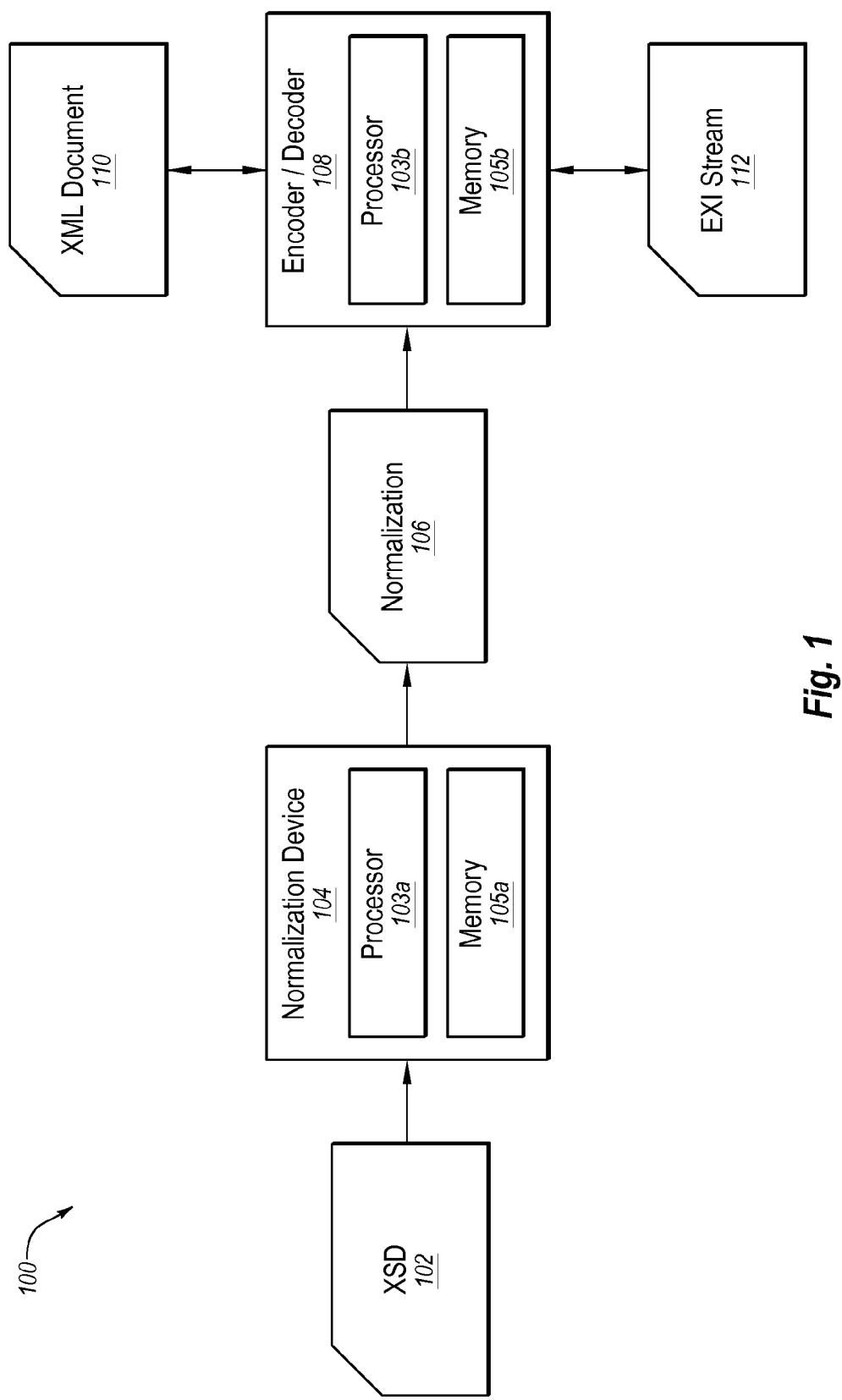
FIG. 1 is a block diagram of an example efficient extensible markup language interchange (EXI) processing system.

FIG. 1 is a block diagram of an example EXI processing system 100. The EXI processing system 100 includes a normalization device 104. The normalization device 104 may be configured to receive an XSD 102 and to output a normalization 106. The normalization 106 of the XSD may be used, for example, in encoding and/or decoding an XML document.

The normalization device 104 may be configured to perform one or more operations of a grammar-generating process. According to some embodiments described herein, the normalization device 104 may generate a grammar and assign multiple elements having a same particular attribute profile and using the same type to the generated grammar. Thus, in some instances, the XSD 102 including multiple elements may result in the normalization 106 including fewer generated grammars than the number of elements of the XSD 102, which may potentially reduce the amount of memory used to store grammar definitions.

The normalization 106 may be communicated to an encoder/decoder 108. An example encoder/decoder 108 may be included in the OpenEXI project hosted at SourceForge.net. The source code and documentation of the OpenEXI project as of the filing date of this application are incorporated herein by reference in their entirety. The encoder/decoder 108 may be configured to receive an XML document 110 and to encode the XML document 110 as an EXI stream 112. Alternately or additionally, the EXI stream 112 may also be received by the encoder/decoder 108 and decoded as the XML document 110. An original XML document 110 and the XML document 110 generated by the encoder/decoder 108 may include substantially identical XML data. However, certain types of human-readable information, such as whitespace, comments, and/or processing instructions, may not be preserved by the encoder/decoder 108 depending on associated preservation settings of the encoder/decoder 108.

The normalization device 104 may include a processor 103a and a memory 105a. The encoder/decoder 108 may include a processor 103b and a memory 105b. The memory 105a and the memory 105b may include non-transitory computer-readable media. Instructions such as programming code executable by the processor 103a and the processor 103b may be encoded in the memory 105a and the memory 105b, respectively. When the instructions are executed by the processor 103a and/or the processor 103b, the normalization device 104 and/or the encoder/decoder 108 may perform operations related to and/or including the processes described herein.

The normalization device 104 and/or the encoder/decoder 108 may be employed in an embedded device and/or a device with limited memory capacity. Examples of embedded devices and/or devices with limited memory capacity include, but are not limited to, sensors, microcontrollers, and appliances, such as energy management controllers, automobile microcontrollers, smart meters, or the like.

Figure 2:
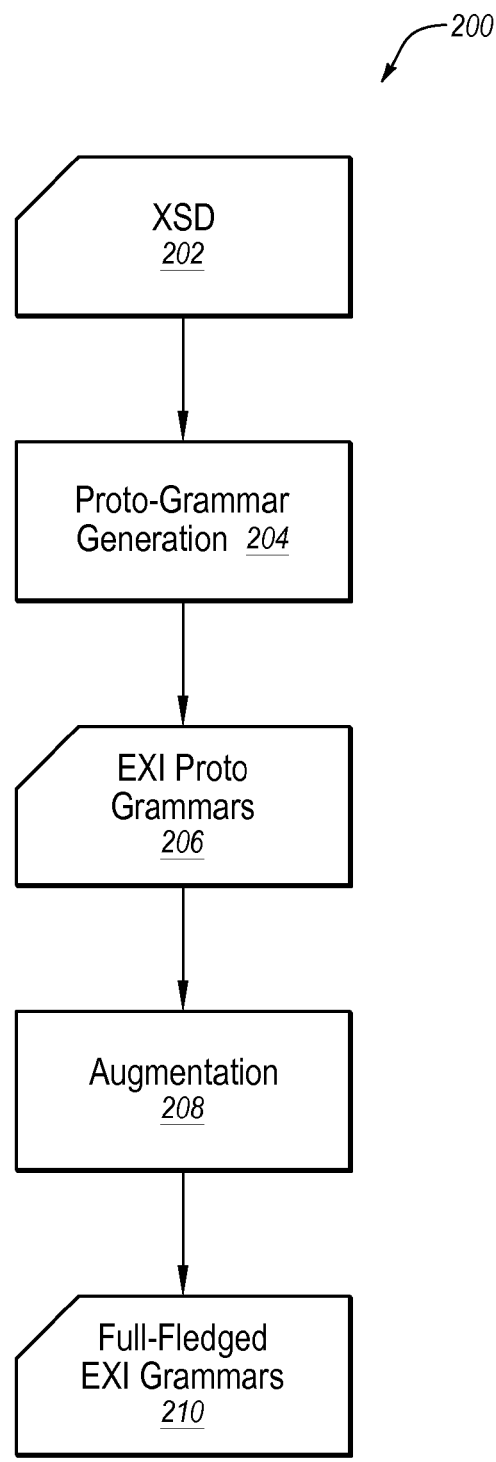
FIG. 2 is a flowchart of an example process of generating full-fledged EXI grammars from an extensible markup language schema definition (XSD)

FIG. 2 is a flowchart of an example process 200 of generating full-fledged EXI grammars 210 from an XSD 202. In some embodiments, the process 200 may be performed by the normalization device 104 of FIG. 1.

The process 200 may begin with the XSD 202. A set of EXI proto-grammars 206 may be generated from the XSD 202 at block 204.

In some embodiments, proto-grammar generation 204 may correspond to section 8.5.4.1 of the EXI Format 1.0 Specification. Alternately, the proto-grammar generation 204 may be performed in a different or modified manner.

The EXI proto-grammars 206 may be augmented at block 208, forming the full-fledged EXI grammars 210. Augmenting the EXI proto-grammars 206 may include inserting additional attributes, properties, or the like. One or more of the embodiments described herein may occur at block 206.

Figure 3:
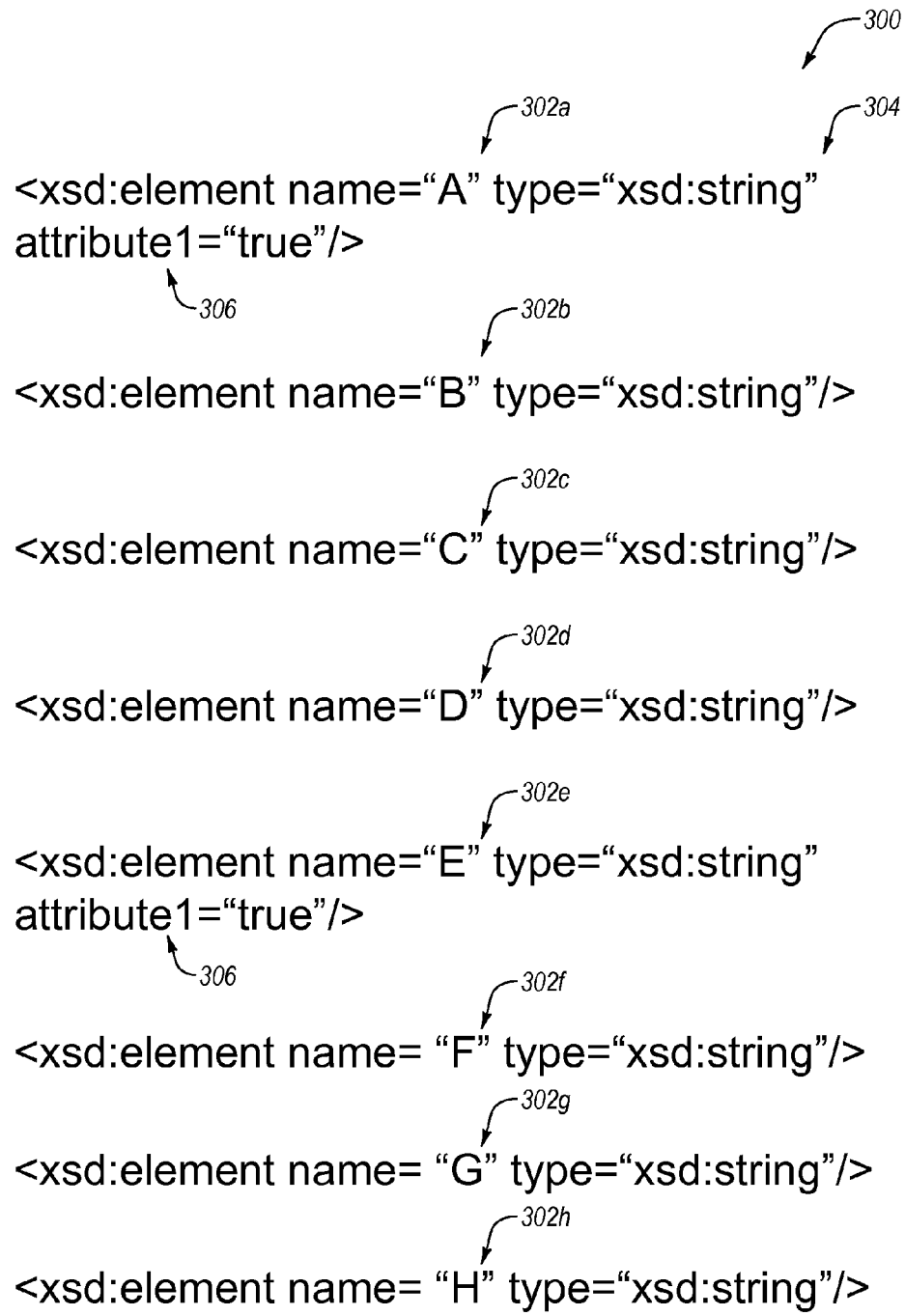
FIG. 3 illustrates a portion of an example XSD.

FIG. 3 illustrates a portion of an example XSD 300. The XSD 300 may include element A 302a through element H 302h (collectively "elements 302") that may have associated datatypes 304. Although the datatypes 304 are shown as string datatypes, other datatypes may alternately or additionally be used. The datatypes 304 may be defined by an EXI specification, an XML specification, and/or may be user-defined. The datatypes 304 may be associated with one or more acceptable formats and/or values for characters associated with corresponding elements 302.

Figure 4:
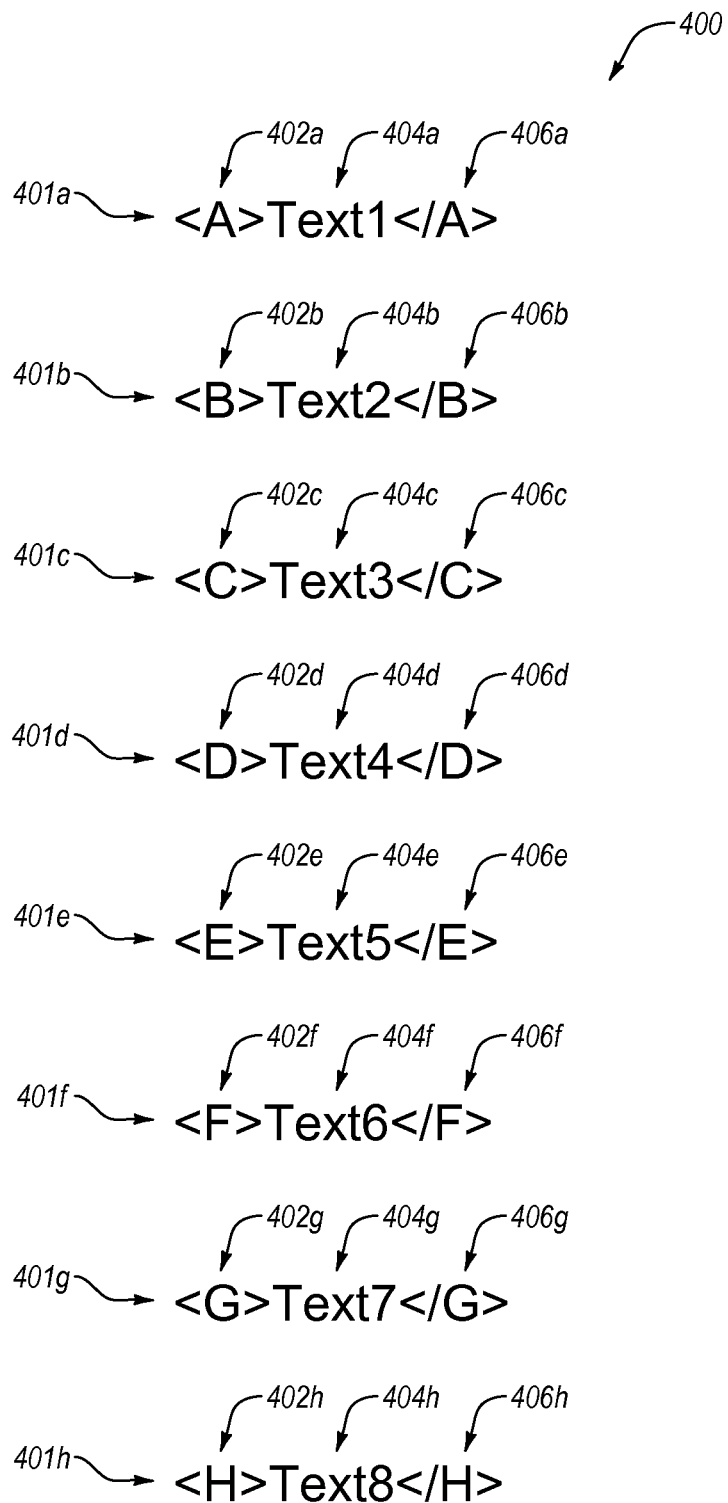
FIG. 4 illustrates a portion of an example extensible markup language (XML) document based on the XSD of FIG. 2.

FIG. 4 illustrates a portion of an example XML document 400 based on the XSD 300 of FIG. 3. The XML document 400 includes elements 401a-h (collectively "elements 401") corresponding, respectively, to the elements 302 of FIG. 3. Each of the elements 401 may include start elements 402a-402h (collectively "start elements 402"), followed by characters 404a-404h (collectively "characters 404") and end elements 406a-406h (collectively "end elements 406"). Each of the characters 404 may be encoded according to a grammar generated according to some embodiments described herein.

With reference to FIG. 3, each of the elements 302 may have an associated attribute profile. In some embodiments, attribute profiles may define a presence or an absence of one or more attributes. Alternately or additionally, the attribute profile may define a value of one or more attributes, a range of one or more attributes, or the like.

Attributes may be defined for the elements 302 implicitly. For example, by default, each of the elements 302 may not be associated with an attribute unless the attribute is otherwise assigned to the elements 302. In some embodiments, the elements 302 may be assigned an attribute based on characteristics of the elements 302. For example, an element such as an element 302b may be assigned a particular attribute based on an interpretation of the XSD 300, such as by considering the manner the element 302b is used in the XSD 300. In some embodiments, attributes based on an interpretation of the XSD 300 may be determined at a compilation of the XSD 300. Alternately or additionally, attributes of the elements 302 may be defined explicitly. For example, the element A 302a and an element E 302E may be explicitly assigned a particular attribute designated as attribute1 306 in the XSD.

In some embodiments, each of the elements 302 may be associated with nillable and/or dynamically typable ("typable") attributes. Alternately or additionally, the elements 302 may be associated with other attributes.

An element associated with the nillable attribute may be given a null value. Conversely, an element not associated with the nillable attribute may not be given a null value.

An element associated with the typable attribute may be associated with elements having derived types. For example, if the element 302a has children elements (not shown), the element 302a may be associated with the typable attribute. Alternatively, if the element 302a has no children elements, the element 302a may not be associated with the typable attribute.

The attribute profiles for the elements 302 may define a presence of the typable attribute (e.g., the element may be "typable") or an absence of the typable attribute (e.g., the element may be "not typable") and a presence of the nillable attribute (e.g., the element may be "nillable") or an absence of the nillable attribute (e.g., the element may be "not nillable").

According to some embodiments described herein, elements having the same particular attribute profile may be assigned the same generated grammar. For instance, a single first state and a single second state may be generated for all ten of the elements. By way of example, for an XSD including ten elements having both a "string" datatype and a particular attribute profile of typable and not nillable, one of the following first states and one of the following second states may be generated:

First state:

```
<Grammar>
   <Productions>
      <CharactersTyped/>
      <Grammar>1</Grammar>
      <XsiType/>
```

-continued

First state:

```
    </Productions>
  </Grammar>
```

Second state:

```
  <Grammar>
    <Productions>
      <EndElement/>
    </Productions>
  </Grammar>
```

In some instances, the above first state may occupy 94 bytes and the above second state may occupy 59 bytes. In this embodiment, the total bytes occupied by the definition of a single grammar in the above example may be 153 bytes.

By comparison, in some formats, e.g., in the current EXI Format 1.0 Specification, a separate grammar may be generated for each of the elements, which may occupy a relatively higher number of bytes. By way of example, for an XSD including ten elements having both a "string" datatype and a particular attribute profile of typable and not nillable as in the embodiment above, ten of the above first states and one of the above second states may be generated. In this example, the total bytes occupied by the definition of the ten grammars may be 999 bytes.

In some embodiments, a single grammar may be generated for each particular attribute profile. Using nillable and typable attributes as an example, the elements 302 may have one of four particular attribute profiles: 1) not nillable and not typable, 2) not nillable and typable, 3) nillable and not typable, and 4) nillable and typable. A first grammar may be generated for not nillable and not typable elements, a second grammar may be generated for not nillable and typable elements, a third grammar may be generated for nillable and not typable elements, and a fourth grammar may be generated for nillable and typable elements. Thus, in some instances, four or fewer grammars may be generated for multiple elements, potentially significantly reducing the number of bytes occupied by grammar definitions.

In some embodiments, an XML document such as the XML document 400 of FIG. 4 may be encoded as an EXI stream. An associated normalization may include a single grammar for encoding multiple elements having the same particular attribute profile.

For example, with combined reference to FIG. 3 and FIG. 4, element A 401a and element E 401e may both include a first particular attribute profile, element B 401b and element F 401f may both include a second particular attribute profile, element C 401c and element G 401g may both include a third particular attribute profile, and element D 401d and element H 401h may both include a fourth particular attribute profile. A first grammar may be generated for the first particular attribute profile, a second grammar may be generated for the second particular attribute profile, a third grammar may be generated for the third particular attribute profile, and a fourth grammar may be generated for the fourth particular attribute profile.

Therefore, encoding the XML document 400 as the EXI stream may include encoding characters 404a and characters 404e according to the first grammar, encoding characters 404b and characters 404f according to the second grammar, encoding characters 404c and characters 404g according to the third grammar, and encoding characters 404d and characters 404h according to the fourth grammar. Decoding the resulting EXI stream may be performed by decoding the encoded characters according to the associated first, second, third, or fourth grammars.

Figure 5:
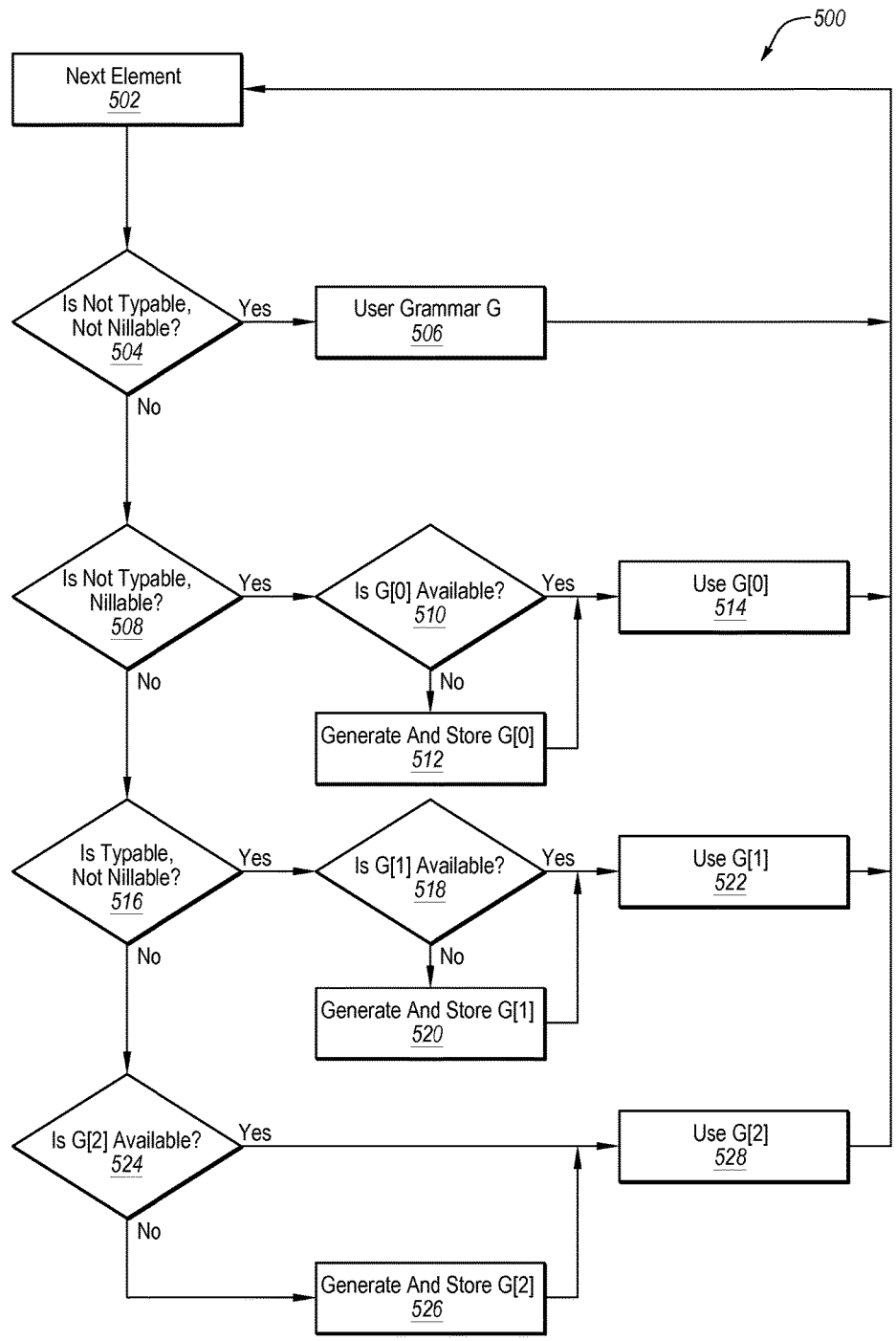
FIG. 5 is a flowchart of an example process of generating grammars.

FIG. 5 is a flowchart of an example process 500 of generating grammars for elements. By way of example, the process 500 is described with reference to elements having attribute profiles that may define the presence or absence of the typable attribute and the nillable attribute. However, other attributes may alternately or additionally be used. In some embodiments, the process 500 may be performed by the processor 103a of the EXI processing system 100 of FIG. 1.

In some embodiments, the process 500 may be performed individually for each datatype used in an associated XSD. Alternately, the process 500 may be performed once for multiple datatypes. For example, where a single proto-grammar is generated for multiple datatypes, the process 500 may be performed once for the multiple datatypes.

The process 500 may begin at block 502, where an element may be considered. The element may be part of an XSD such as the XSD 300 of FIG. 3.

At block 504, the process 500 may determine whether the element is not typable and not nillable. If the element is not typable and not nillable, the process 500 may continue to block 506. Otherwise, the process 500 may continue to block 508.

At block 506, a grammar G may be used for the element such that the grammar G may be associated with the particular attribute profile "not typable and not nillable." For example, the grammar G may be associated with the element within a normalization such as the normalization 106 of the EXI processing system 100 of FIG. 1. In some embodiments, the grammar G may be the proto-grammar associated with the element. For example, the grammar G may be the proto-grammar generated at block 204 of the process 200 of FIG. 2 and may be associated with the element.

At block 508, the process 500 may determine whether the element is not typable and nillable. If the element is not typable and nillable, the process 500 may continue to block 510. Otherwise, the process 500 may continue to block 516.

At block 510, the process may determine whether a grammar G[0] is available. The grammar G[0] may be an augmented copy of the grammar G associated with the particular attribute profile "not typable and nillable." If the grammar G[0] is available, the process 500 may continue to block 514.

If the grammar G[0] is not available, the grammar G[0] may be generated and stored at block 512 before continuing to block 514. In some embodiments, the grammar G[0] may be generated via the process described in section 8.5.4.4.2 of the EXI Format 1.0 Specification. By way of example, the grammar G[0] may be stored in the memory 105a of the EXI processing system 100 of FIG. 1.

At block 514, the grammar G[0] may be used for the element. For example, the grammar G[0] may be associated with the element within the normalization.

At block 516, the process 500 may determine whether the element is typable and not nillable. If the element is typable and not nillable, the process 500 may continue to block 518. Otherwise, the process 500 may continue to block 524.

At block 518, the process may determine whether a grammar G[1] is available. The grammar G[1] may be an augmented copy of the grammar G associated with the particular attribute profile "typable and not nillable." If the grammar G[1] is available, the process 500 may continue to block 522.

If the grammar G[1] is not available, the grammar G[1] may be generated and stored at block 520 before continuing to block 522. In some embodiments, the grammar G[1] may be generated via the process described in section 8.5.4.4.2 of the EXI Format 1.0 Specification. By way of example, the grammar G[1] may be stored in the memory 105a of the EXI processing system 100 of FIG. 1.

At block 522, the grammar G[1] may be used for the element. For example, the grammar G[1] may be associated with the element within the normalization.

At block 524, it may be known that the element has the particular attribute profile of "typable and nillable," and the process may determine whether a grammar G[2] is available. The grammar G[2] may be an augmented copy of the grammar G associated with the particular attribute profile "typable and nillable." If the grammar G[2] is available, the process 500 may continue to block 528.

If the grammar G[2] is not available, the grammar G[2] may be generated and stored at block 526 before continuing to block 528. In some embodiments, the grammar G[2] may be generated via the process described in section 8.5.4.4.2 of the EXI Format 1.0 Specification. By way of example, the grammar G[2] may be stored in the memory 105a of the EXI processing system 100 of FIG. 1.

At block 528, the grammar G[2] may be used for the element. For example, the grammar G[2] may be associated with the element within the normalization.

After grammar G, G[0], G[1], or G[2] is associated with the element, the process 500 may optionally return to block 502 to begin again with a new element.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:

receiving an extensible markup language (XML) document that is based on an XML schema definition (XSD) that includes a plurality of elements having a datatype, each of the plurality of elements having an attribute profile, the attribute profile defining a presence or an absence of a first attribute that includes a typable attribute and the attribute profile defining a presence or an absence of a second attribute that includes a nillable attribute, the plurality of elements including a first element and a second element, the first element and the second element having different element names, the first element having a first particular attribute profile and the second element also having the first particular attribute profile, the XSD having a corresponding first grammar that is generated based on the first particular attribute profile, the first element and the second element being assigned to the first grammar based on the first element and the second element having the first particular attribute profile and based on the first grammar being generated based on the first particular attribute profile, the XML document including:

first characters associated with the first element and the first particular attribute profile; and second characters associated with the second element and the first particular attribute profile; and encoding the XML document as an efficient XML interchange (EXI) stream, including:

encoding the first characters according to the first grammar based on the first characters being associated with the first element and based on the first element being assigned to the first grammar; and encoding the second characters according to the first grammar based on the second characters being associated with the second element and based on the second element being assigned to the first grammar.

2. The method of claim 1, wherein the XML document is encoded as an EXI stream according to a normalization including the first grammar.

3. The method of claim 1, wherein:
the plurality of elements include a third element having a second particular attribute profile and a fourth element having the second particular attribute profile, the XSD having a corresponding second grammar that is generated based on the second particular attribute profile, the third element and the fourth element being assigned to the second grammar based on the third element and the fourth element having the second particular attribute profile and based on the second grammar being generated based on the second particular attribute profile;
the XML document further includes:
third characters associated with the third element and the second particular attribute profile; and
fourth characters associated with the fourth element and the second particular attribute profile; and
encoding the XML document as an EXI stream further includes:
encoding the third characters according to the second grammar based on the third characters being associated with the third element and based on the third element being assigned to the second grammar; and
encoding the fourth characters according to the second grammar based on the fourth characters being associated with the fourth element and based on the fourth element being assigned to the second grammar.

4. The method of claim 3, wherein:
the plurality of elements include:
a fifth element and a sixth element, each having a third particular attribute profile;
a seventh element and an eighth element, each having a fourth particular attribute profile;
the XML document further includes:
fifth characters associated with the fifth element and the third particular attribute profile;
sixth characters associated with the sixth element and the third particular attribute profile;
seventh characters associated with the seventh element and the fourth particular attribute profile; and
eighth characters associated with the eighth element and the fourth particular attribute profile; and
encoding the XML document as an EXI stream further includes:
encoding the fifth characters according to a third grammar;
encoding the sixth characters according to the third grammar;
encoding the seventh characters according to a fourth grammar; and
encoding the eighth characters according to the fourth grammar.

5. The method of claim 4, wherein:
the first particular attribute profile is associated with the absence of the first attribute and the absence of the second attribute;
the second particular attribute profile is associated with the absence of the first attribute and the presence of the second attribute;
the third particular attribute profile is associated with the presence of the first attribute and the absence of the second attribute; and the fourth particular attribute profile is associated with the presence of the first attribute and the presence of the second attribute.

6. The method of claim 5, wherein the first grammar is associated with encoding and decoding the XML document, based on the XSD, to and from the EXI stream.

7. The method of claim 6, further comprising assigning the first element and the second element to the first grammar based on the first element and the second element having the first particular attribute profile.

8. The method of claim 6, further comprising associating the third element and the fourth element with the second grammar based on the third element and the fourth element having the second particular attribute profile.

9. The method of claim 8, further comprising generating the third grammar based on the third particular attribute profile.

10. The method of claim 9, further comprising generating the fourth grammar based on the second particular attribute profile.

11. The method of claim 1, further comprising:
receiving the XSD;
generating the first grammar based on the first particular attribute profile; and
assigning the first element and the second element to the first grammar.

12. The method of claim 11, wherein a third element and a fourth element of the plurality of elements each include a second particular attribute profile, and the method further comprises:
generating a second grammar based on the second particular attribute profile; and
associating the third element and the fourth element with the second grammar.

13. The method of claim 12, wherein:
the first particular attribute profile is associated with the absence of the first attribute and the absence of the second attribute;
the second particular attribute profile is associated with the presence of at least one of the first attribute and the second attribute; and
the first grammar is a proto-grammar associated with the datatype of the plurality of elements.

14. The method of claim 12, wherein a fifth element and a sixth element of the plurality of elements include a third particular attribute profile, and the method further comprises:
generating a third grammar based on the third particular attribute profile; and
associating the fifth element and the sixth element with the third grammar.

15. The method of claim 14, wherein a seventh element and an eighth element of the plurality of elements include a fourth particular attribute profile, and the method further comprises:
generating a fourth grammar based on the fourth particular attribute profile; and
associating the seventh element and the eighth element with the fourth grammar.

16. The method of claim 15, wherein:
the first particular attribute profile is associated with the absence of the first attribute and the absence of the second attribute;
the second particular attribute profile is associated with the absence of the first attribute and the presence of the second attribute;

the third particular attribute profile is associated with the presence of the first attribute and the absence of the second attribute; and the fourth particular attribute profile is associated with the presence of the first attribute and the presence of the second attribute.

\* \* \* \* \*